United States Patent [19]

Murai et al.

[11] Patent Number: 4,834,530

[45] Date of Patent: May 30, 1989

[54] SHAPE MEASURING APPARATUS

[75] Inventors: Shunji Murai; Fumio Othomo; Hitoshi Otani, all of Tokyo, Japan

[73] Assignee: Tokyo Kogaku Kikai Kabushiki Kaisha, Tokyo, Japan

[21] Appl. No.: 39,455

[22] Filed: Apr. 17, 1987

[30] Foreign Application Priority Data

Apr. 18, 1986 [JP] Japan .................................. 61-89514

[51] Int. Cl.$^4$ ........................ G01B 11/24; G01C 11/02
[52] U.S. Cl. .......................................... 356/2; 353/25; 356/376
[58] Field of Search ..................... 356/2, 376; 250/558; 353/22, 25, 40

[56] References Cited

U.S. PATENT DOCUMENTS

| | | | |
|---|---|---|---|
| 3,866,052 | 2/1975 | DiMatteo et al. | 356/2 |
| 4,185,918 | 1/1980 | DiMatteo et al. | 356/2 |
| 4,259,589 | 3/1981 | DiMatteo et al. | 250/558 |
| 4,634,278 | 1/1987 | Ross et al. | 356/376 |

Primary Examiner—Richard A. Rosenberger

Attorney, Agent, or Firm—Finnegan, Henderson, Farabow, Garrett & Dunner

[57] ABSTRACT

A shape measuring apparatus is disclosed. It comprises a pattern portion having a pattern in which pattern elements are arranged in the pitch width direction according to a predetermined rule so that a plurality of N codes can be distinguished with respect to one another; a projecting portion having a moving portion for moving the pattern in the pitch width direction according to a rule and projection optical system for projecting the pattern onto an object to be measured; a detecting portion for detecting a first detection data and a second detection data by measuring a surface information of the object to be measured on which the pattern is projected from two different directions every time the pattern is moved by the moving portion; an extracting portion for extracting a first position data and a second position data corresponding to a point position of the object to be measured from the first and second detection data respectively; and a calculating portion for calculating a coordinate of the point position corresponding to the first position data of the object to be measured from the first position data and the second position data.

7 Claims, 9 Drawing Sheets

| No | D8 | D7 | D6 | D5 | D4 | D3 | D2 | D1 | B-D |
|---|---|---|---|---|---|---|---|---|---|
| 1 | 0 | 0 | 0 | 0 | 0 | 0 | 0 | 1 | 1 |
| 2 | 0 | 0 | 0 | 0 | 0 | 0 | 1 | 0 | 2 |
| 3 | 0 | 0 | 0 | 0 | 0 | 1 | 0 | 0 | 4 |
| 4 | 0 | 0 | 0 | 0 | 1 | 0 | 0 | 0 | 8 |
| 5 | 0 | 0 | 0 | 1 | 0 | 0 | 0 | 1 | 17 |
| 6 | 0 | 0 | 1 | 0 | 0 | 0 | 1 | 1 | 35 |
| 7 | 0 | 1 | 0 | 0 | 0 | 1 | 1 | 1 | 71 |
| 8 | 1 | 0 | 0 | 0 | 1 | 1 | 1 | 0 | 142 |
| 9 | 0 | 0 | 0 | 1 | 1 | 1 | 0 | 0 | 28 |
| 10 | 0 | 0 | 1 | 1 | 1 | 0 | 0 | 0 | 56 |
| 11 | 0 | 1 | 1 | 1 | 0 | 0 | 0 | 1 | 113 |
| 12 | 1 | 1 | 1 | 0 | 0 | 0 | 1 | 0 | 226 |
| 13 | 1 | 1 | 0 | 0 | 0 | 1 | 0 | 0 | 196 |
| 14 | 1 | 0 | 0 | 0 | 1 | 0 | 0 | 1 | 137 |
| 15 | 0 | 0 | 0 | 1 | 0 | 0 | 1 | 0 | 18 |
| 16 | 0 | 0 | 1 | 0 | 0 | 1 | 0 | 1 | 37 |
| 17 | 0 | 1 | 0 | 0 | 1 | 0 | 1 | 1 | 75 |
| 18 | 1 | 0 | 0 | 1 | 0 | 1 | 1 | 1 | 151 |
| 253 | 1 | 0 | 1 | 0 | 0 | 0 | 0 | 0 | 160 |
| 254 | 0 | 1 | 0 | 0 | 0 | 0 | 0 | 0 | 64 |
| 255 | 1 | 0 | 0 | 0 | 0 | 0 | 0 | 0 | 128 |

PITCH WIDTH DIRECTION

| DEGREE $n^k$ | COMPONENT OF SHIFT REGISTER | NUMBER PATTERN ELEMENT |
|---|---|---|
| 4 | $D_4 \oplus D_3 \oplus I$ | $2^4 - 1 = 15$ |
| 5 | $D_5 \oplus D_3 \oplus I$ | $2^5 - 1 = 31$ |
| 6 | $D_6 \oplus D_5 \oplus I$ | $2^6 - 1 = 63$ |
| 7 | $D_7 \oplus D_4 \oplus I$ | $2^7 - 1 = 127$ |
| 8 | $D_8 \oplus D_6 \oplus D_5 \oplus D_4 \oplus I$ | $2^8 - 1 = 255$ |
| 9 | $D_9 \oplus D_5 \oplus I$ | $2^9 - 1 = 511$ |
| 10 | $D_{10} \oplus D_7 \oplus I$ | $2^{10} - 1 = 1023$ |

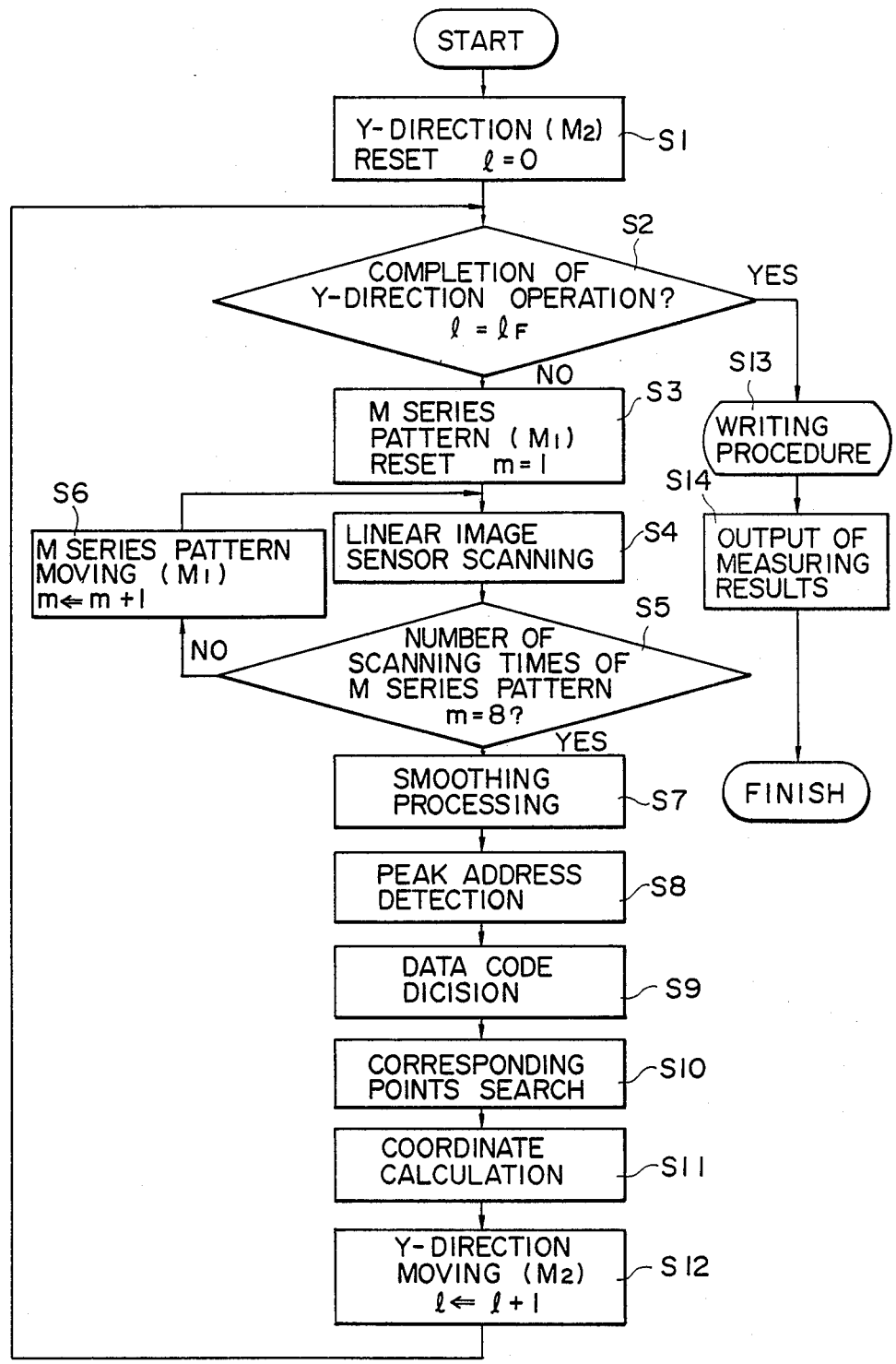

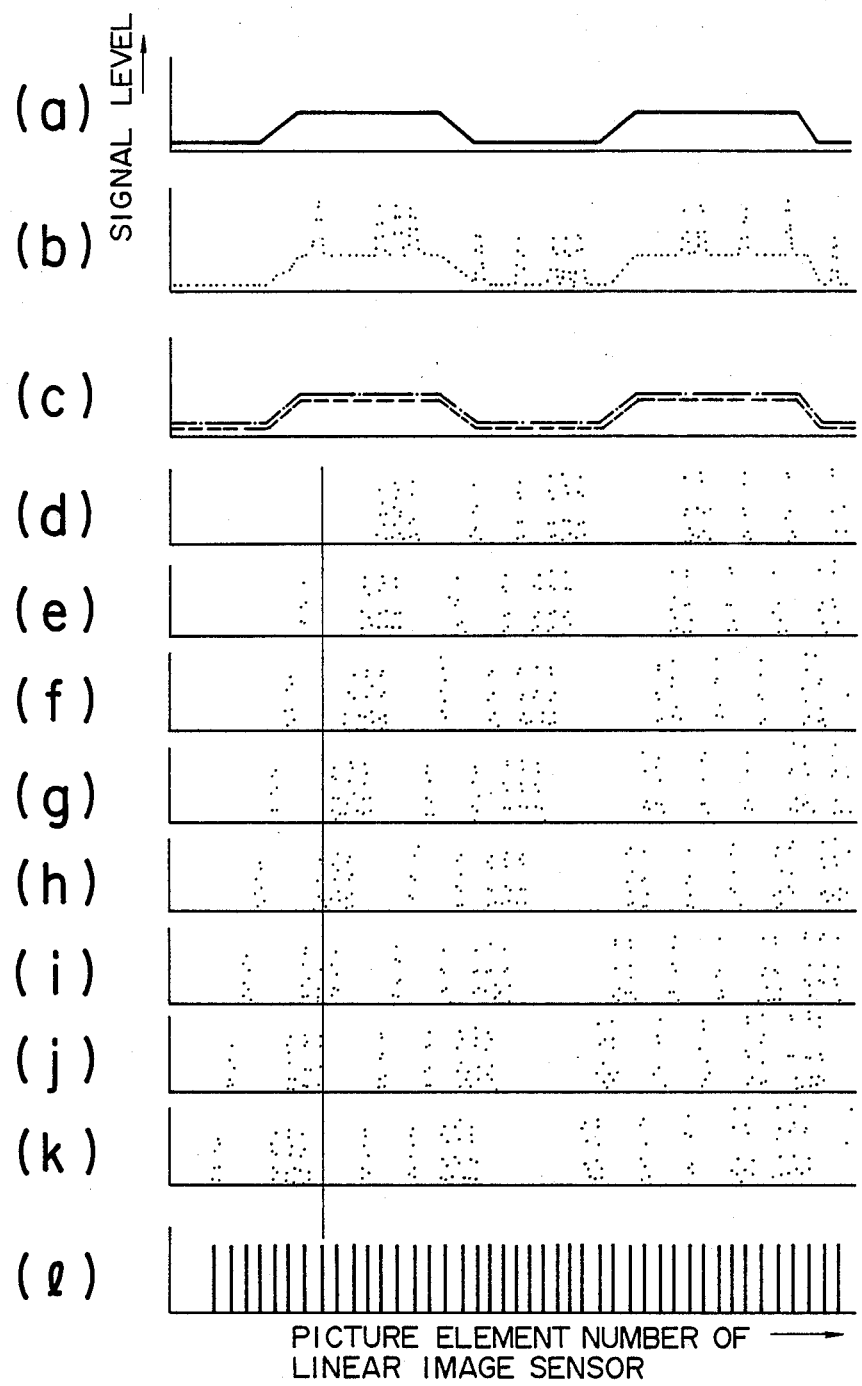

FIG. 8(a)

| Address Number | 1 | 2 | 3 | 4 | 5 | 6 | 7 | 8 | 9 | 10 | 11 | 12 | ... | 255 |
|---|---|---|---|---|---|---|---|---|---|---|---|---|---|---|
| Data Code | 1 | 2 | 4 | 8 | 17 | 35 | 71 | 142 | 28 | 56 | 113 | 226 | ... | 128 |

FIG. 8(b)

| | 1 | 2 | 3 | 4 | 5 | 6 | 7 | 8 | 9 | 10 | 11 | 12 |
|---|---|---|---|---|---|---|---|---|---|---|---|---|
| Data Code | 1 | 2 | 4 | 8 | 8 | 17 | 35 | 71 | 142 | 28 | 56 | 113 |
| Address Number | 1 | 2 | 3 | 4 | 4 | 5 | 6 | 7 | 8 | 9 | 10 | 11 |

FIG. 8(c)

| | 1 | 2 | 3 | 4 | 5 | 6 | 7 | 8 | 9 | 10 | 11 | 12 |
|---|---|---|---|---|---|---|---|---|---|---|---|---|
| Data Code | 1 | 2 | 4 | 8 | 17 | 71 | 142 | 28 | 56 | 113 | 226 | 196 |
| Address Number | 1 | 2 | 3 | 4 | 5 | 7 | 8 | 9 | 10 | 11 | 12 | 13 |

SHAPE MEASURING APPARATUS

BACKGROUND OF THE INVENTION

1. Field of the Invention

This invention relates to a shape measuring apparatus. More particularly, it relates to a shape measuring apparatus of the type in which a predetermined pattern is projected onto an object to be measured, each point of the object to be measured being particulated, a data based on a projection pattern being detected from the object to be measured on which the pattern is projected, the detection data being processed, thereby to obtain a shape of the object to be measured by measuring the coordinate at the respective point positions on the object to be measured by means of non-contact measurement.

2. Description of the Related Art

Heretofore, there has been known a non-contact type shape measuring apparatus in which a predetermined pattern is projected to an object to be measured and this pattern is detected from two directions to decide a corresponding point between the respective detection outputs and, based on the foregoing, the shape of the object to be measured is measured.

In recent years, in such non-contact type shape measuring apparatus, since a high accuracy and high resolution measurement is required, projection pattern images are projected to an object to be measured using plural kinds of patterns and every time the respective patterns are projected, projection data is detected so as to correspond the respective data points relative to one another when the respective patterns are projected, thereby to measure the shape of the object to be measured highly accurately.

3. Problems to be Solved by the Invention

However, in order to perform a high accuracy measurement of an object to be measured in the above-mentioned non-contact type shape measuring apparatus, plural kinds of patterns are separately required. In addition, in order to project the plural kinds of patterns to the object to be measured and to correspond the data with the respective projected patterns, the relative positions of the plural kinds of patterns must be strictly decided. Thus, the apparatus is required to be made large in size and complicated adjusting means are required.

SUMMARY OF THE INVENTION

1. Object of the Invention

The present invention was accomplished in view of the problems involved in the conventional shape measuring apparatus. It is therefore a general object of the present invention to provide a shape measuring apparatus, in which plural kinds of different projection pattern images can be obtained by moving only one pattern, thereby to measure the shape of an object to be measured highly accurately and easily.

2. Means for Solving the Problems

In order to solve the above-mentioned problems, there is essentially provided a shape measuring apparatus comprising a pattern portion having a pattern in which pattern elements are arranged in the pitch width direction according to a predetermined rule so that a plurality of N codes can be distinguished with respect to one another; a projecting means having a moving means for moving the pattern in the pitch width direction according to a rule and a projection optical system for projecting the pattern onto an object to be measured; a detecting means for detecting a first detection data and a second detection data by measuring a surface information of the object to be measured on which the pattern is projected from two different directions every time the pattern is moved by the moving means; an extracting means for extracting a first position data and a second position data corresponding to a point position of the object to be measured from the first and second detection data respectively; and a calculating portion for calculating a coordinate of the point position corresponding to the first position data in accordance with the first position data and the second position data.

3. Description of the Function of the Present Invention

According to the present invention, plural kinds of different projection pattern images can be obtained merely by moving only one pattern in the pitch width direction without preparation of plural kinds of patterns.

Other objects, advantages and features of the present invention will become readily apparent to those skilled in the art from the following detailed description of the preferred embodiment.

BRIEF DESCRIPTION OF THE DRAWINGS

FIG. 6 is a flow chart for explaining the function of a shape measuring apparatus according to the present invention;

FIG. 7 is a schematic view of a detection output for explaining the function of a shape measuring apparatus according to the present invention;

FIGS. 8(*a*), 8(*b*) and 8(*c*) are illustrations for explaining tables which is used when data are processed using a shape measuring apparatus according to the present invention;

DETAILED DESCRIPTION OF THE PREFERRED EMBODIMENT

One preferred embodiment of the present invention will be described with reference to the accompanying drawings.

Figure 1:
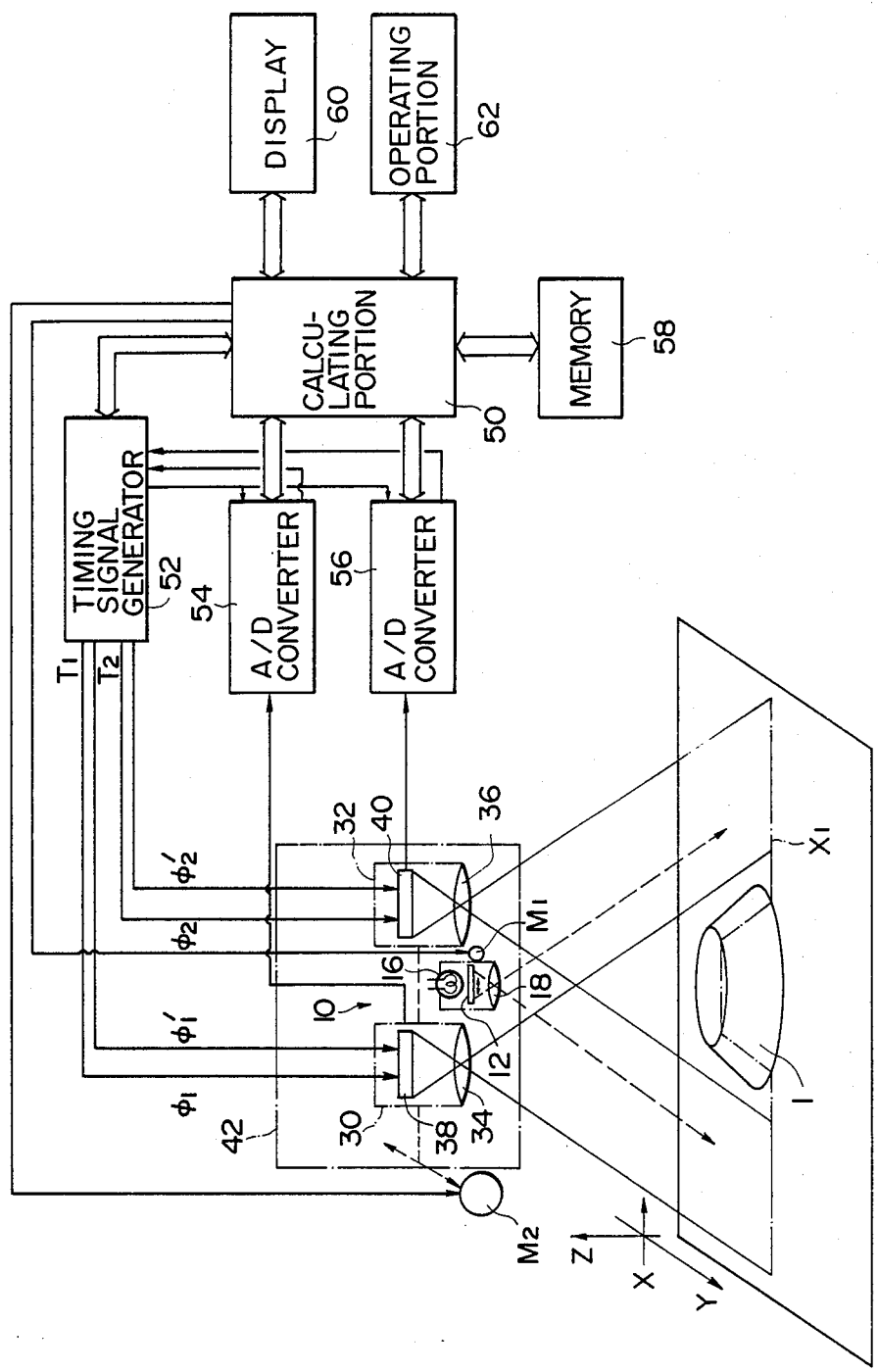
FIG. 1 is a schematic view of an important portion of a shape measuring apparatus according to the present invention.

In FIG. 1, 1 denotes an object to be measured, and 10 denotes a projecting means. The projecting means 10 is provided with a motor $M_1$. Furthermore, the projecting means or portion 10 is provided with a pattern plate 12, a light source 16 and a projection lens 18 as a pattern portion. The pattern plate 12 is formed with a pattern 14. The pattern 14 is projected as a pattern image to the object 1 to be measured by the light source 16 and projection lens 18. The light source 16 and projection lens 18 constitute a projection optical system for projecting the pattern 14 to the object 1 to be measured as the pattern image. The motor $M_1$ acts as a moving portion for linearly moving the pattern plate 12 in the pitch width direction of the pattern 14.

Figures 2, 3:
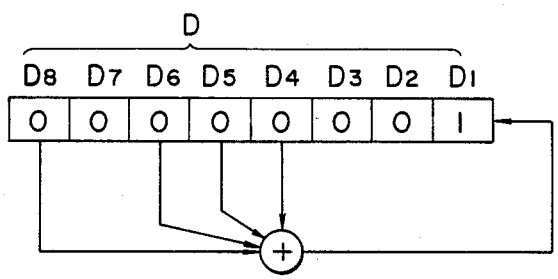
FIG. 2 is a schematic view of one example of a register for preparing an M series pattern according to the present invention.
FIG. 3 is a table of binary to decimal numerals showing the contents of a register for obtaining the M series according to the present invention.

The pattern 14 is shown and explained as an M series pattern in this embodiment. The M series pattern is the longest series pattern which can be made based on binary numbers. In general, an M series of $n^{th}$ (n is an integer) has a pattern element of $(2^n-1)$ bit, and $(2^n-1)$ kinds of different codes are formed by adjacent $n^{th}$ binary numbers. This M series can be easily made by using a shift register, for example, if n=8 is given, an $8^{th}$ M series can be formed by means of feed back using a shift register D comprising 8 bits $D_1$ through $D_8$ as shown in FIG. 2. In this embodiment, $D_1$ corresponds to a $2^0$ digit, $D_2$ corresponds to a $2^1$ digit, $D_3$ corresponds to a $2^2$ digit, $D_4$ corresponds to a $2^3$ digit, $D_5$ corresponds to a $2^4$ digit, $D_6$ corresponds to a $2^5$ digit, $D_7$ corresponds to a $2^6$ digit, and $D_8$ corresponds to $2^7$ digit.

The constitution of this shift register D is $D_8+D_6+D_5+D_4+I$, wherein the symbol + is an adding mark which feeds back the contents of $D_8$, $D_6$, $D_5$ and $D_4$ to $D_1$. Symbol I represents an input to a register component element $D_1$ of $2^0$ rigid. When the sum of the contents "1" of the register component elements $D_8$, $D_6$, $D_5$, and $D_4$ is an odd number, the "1" is inputted into the register component element $D_1$, whereas when the sum of the content "1" of the register component elements $D_8$, $D_6$, $D_5$ and $D_4$ is an even number or "0", "0" is inputted into the register component element $D_1$. As an initial value in the shift register D, the content of the register component element $D_1$ is set to "1" and the contents of the register component elements $D_2$ through $D_8$ are set to "0".

That is, the content of the initial value of the shift register D is "00000001". This initial value is set by a first shifting operation. This shift register D renews its content to "00000010" by a second shifting operation. The content of this shift register becomes "00001000" by a fourth shifting operation. Since the content of $D_4$ is "1" at fifth shifting operation, "1" is fed back to $D_1$ and the content of the shift register D becomes "00010001". Since the content of $D_5$ is "1" at the sixth shifting operation, "1" is fed back to $D_1$ in the same procedure as described, and the content of the shift register D becomes "00100011". In the same procedure, the content becomes "01000111" at the seventh shifting operation. Since the contents of $D_8$, $D_6$, $D_5$ and $D_4$ are all "0" at eighth shifting operation, $D_1$ becomes "0" and the content of the shift register becomes "10001110". Since the sum of the ocntents "1" of $D_8$ and $D_4$ are an even number, $D_1$ becomes "0" and the content of the shift register becomes "00011100". When the shifting operation is repeated 255 times, the table shown in FIG. 3 is obtained. When the contents of the shift register D are converted to decimal numbers, the numbers from 1 to 255 appear once for each operations, as shown in the B through D columns. In this embodiment, the M series corresponds to a numeral series of 255 pieces which appear in the register component elements $D_8$ through $D_1$ of the shift register during the first to 255 shifting operations. With reference to column $D_8$, the table of FIG. 3 is addressed vertically across each row. When the eight numbers, which appear during the first to eight shifting operations, are regarded as one binary code, it is known that they correspond to the decimal number "1" of B to D at the first shifting operation. In the same procedure, when the eight numbers, which appear during the second to ninth shifting operations, are regarded as one binary code, it is known that they correspond to the decimal number "2" of B to D at the second operation. In the same procedure, when the eight numbers, which appear during the third to tenth shifting operations, are regarded as one binary code, it is known that they correspond to the decimal number "4" of B to D at the third shifting operation. In this way, the contents of the register component elements $D_8$ are vertically looked for corresponding to 255 decimal numbers. In this embodiment, after the eight numbers appeared during the 248 to 255 shifting operations were corresponded to the 248 shifting operation, it is known that no corresponding numbers are left. Therefore, the contents after the 255 shifting operations are assumed as "0" beforehand. This assumption is correct since the contents of this shifting registers $D_7$ through $D_1$ are "0" at the 255 shifting operation. That is, the shift register D at the 256 shifting operation becomes identical to the content of the first shifting operation again, and the contents of Table 3 are repeated.

In this way, when decimal numbers corresponding to the eight numbers of 255 sets which appear by this shifting operation, the same decimal numbers are not produced at all.

Figures 4, 5:
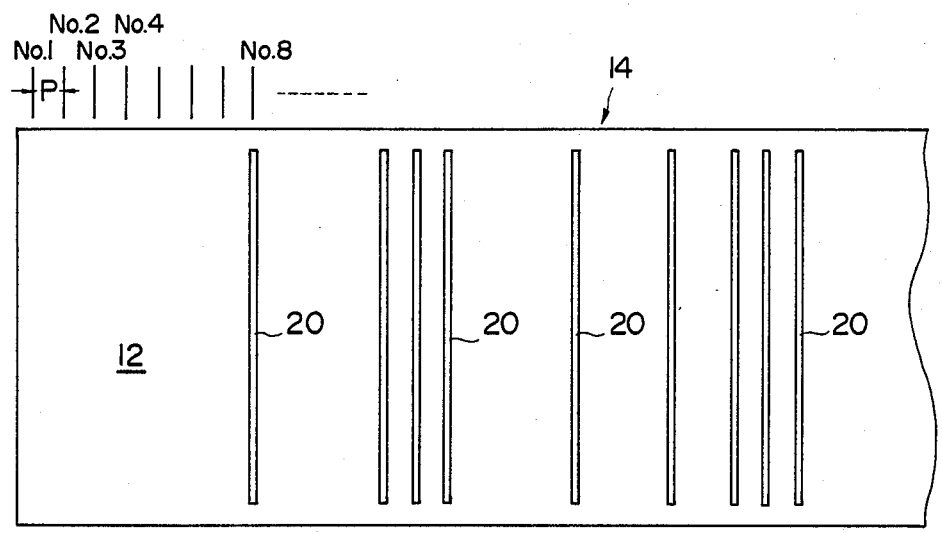
FIG. 4 is a partly enlarged view of a pattern plate having an M series pattern according to the present invention.
FIG. 5 is an illustration for explaining the structure of a shift register for obtaining another M series pattern.
Figure 9:
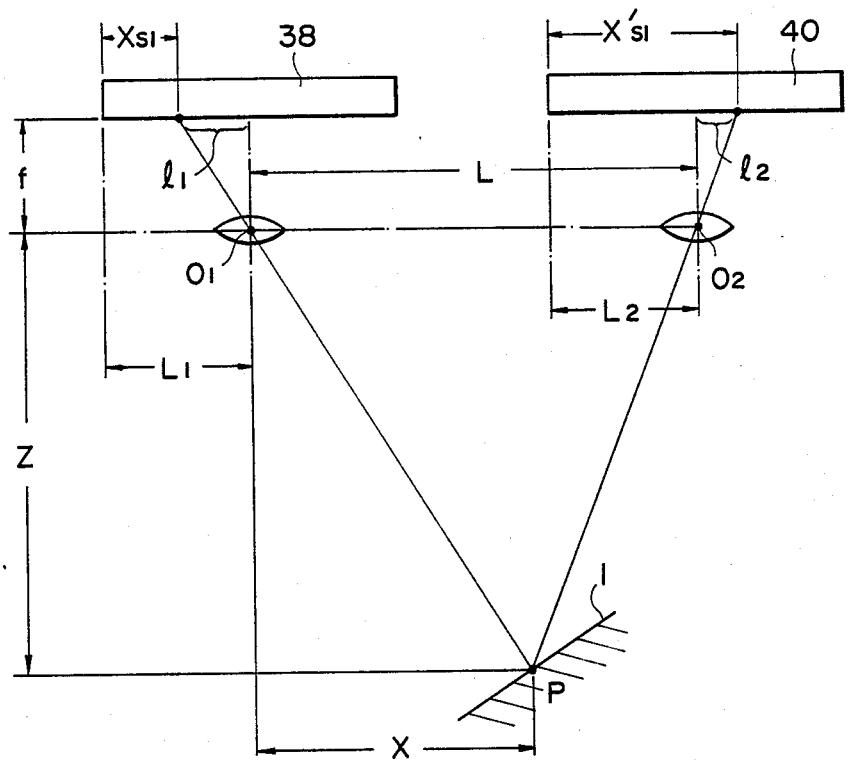
FIG. 9 is an illustration for explaining the calculation for obtaining the coordinate of a point position of an object to be measured using a shape measuring apparatus according to the present invention.
Figure 10:
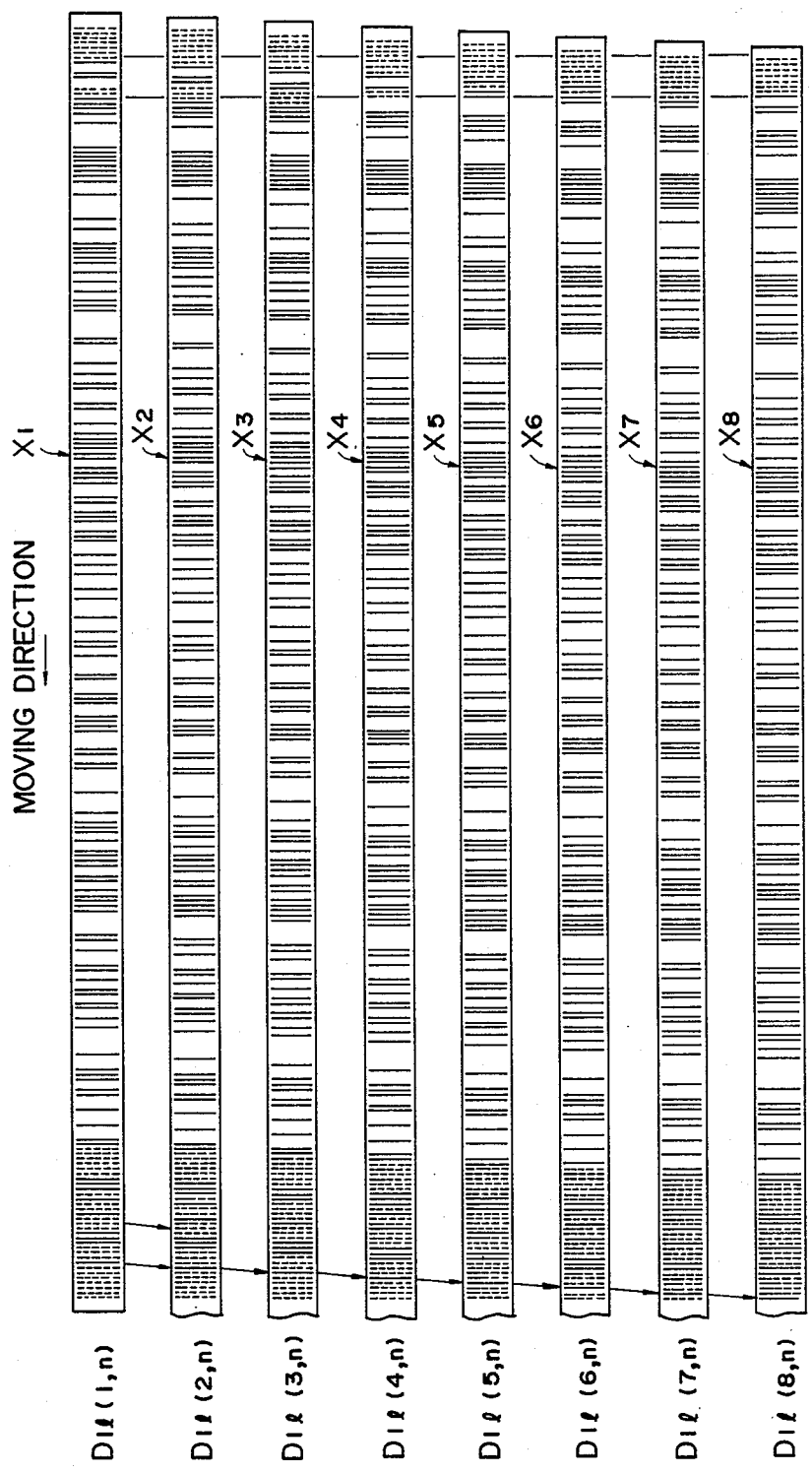
FIG. 10 is a schematic view for showing one example of projection pattern images formed on an object to be measured.
Figure 11:
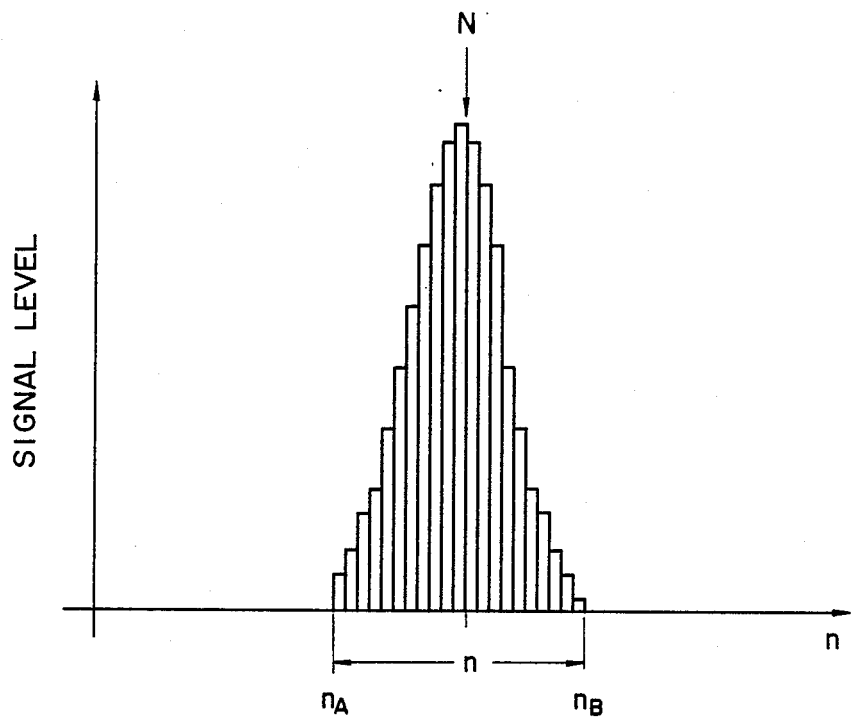
FIG. 11 is a schematic view for showing one example of a peak address processing according to the present invention.

Accordingly, the content "0" of the M series pattern appearing at $D_8$ corresponds to a cut transmission command and the content "1" corresponds to a begin transmission command, and a slit 20 is formed on the pattern plate 12 as shown in FIG. 4. More specifically, the pattern 14 is formed in such a manner that, by making the pitch width as P, the slit 20 is formed at a place corresponding to the content "1" and no slit 20 is formed at a place corresponding to the content "0". In this embodiment, the pitch width direction is the direction crossing the slit 20. Further, the slit width of the slit 20 is small enough with respect to the pitch width P. In the above description, an eighth M series pattern is described. However, other M series can be used as well. Regarding the patterns from the fourth to the tenth, a shift register can be prepared based on the table of FIG. 5. In the above description, the content "0" corresponds shade and the content "1" corresponds to transmission. If desired, the content "0" may correspond to a slit type filter which permits a blue color light to transmit and the content "1" may correspond to a slit type filter which permits a red color light to transmit.

In FIG. 1, a first detecting means 30 and a second detecting means 32 are disposed at both sides of the M series pattern direction formed on the pattern plate 12 of the projecting portion 10. The first detecting means or portion 30 and the second detecting means or portion 32 include objective lenses 34, 36 respectively. Above the objective lenses 34 and 36, a first linear image sensor 38 and a second linear image sensor 40 are disposed in such a manner as to corresponds to the respective objective lenses 34 and 36. The image of the object 1 to be measured on which the M series pattern 14 is projected is formed on the linear image sensors 38 and 40 by the respective objective lenses 34 and 36 respectively.

42 denotes a housing. The housing 42 contains therein the projecting portion 10, first detecting portion 30 and second detecting portion 32. The housing 42 is also movable in the Y direction of FIG. 1 by a motor $M_2$. The first linear image sensor 38 and second linear image sensor 40 are scanned by clock signals $\phi 1$, $\phi 1'$, $\phi 2$ and $\phi 2'$ emitted from a timing pulse generator 52. Due to this scanning, the first linear image sensor 38 and second linear image sensor 40 receive data from each picture element and the same is outputted as a detection data to a first A/D converter 54 and a second A/D converter 56.

The first A/D converter 54 and second A/D converter 56 start a D-conversion by signals emitted from the timing signal generator 52. When this conversion procedure is finished, the first A/D converter 54 and second A/D converter 56 output signals showing the completion of the A/D conversion to the timing signal generator 52 and, at the same time, output the A/D converted detection data to a control calculating means or portion 50 from the first and second linear image sensors 38 and 40. The control calculating portion 50 gives and takes timing signals to and from the timing signal generator 52 and outputs control signals to the motors $M_1$ and $M_2$. In addition, the control calculating portion 50 receives detection data from the first and second A/D converters 54 and 56 for a predetermined processing, writes and reads data in and out of a memory 58, outputs display signals to a displayer 60 to display the measuring results, and receives various commands from an operating portion 62. This control calculating portion 50 acts as an extracting means and a calculating means as will be described hereinafter.

Next, the function of a shape measuring apparatus according to the present invention will be described with reference to the flow chart of FIG. 6, the signal illustration of FIG. 8, and FIGS. 8 through 11.

When the measuring procedure is started, a value necessary for the measurement is set as an initial value in Step $S_1$. That is, in Step $S_1$, a Y-direction reset is performed, the housing 42 is moved to the original point on the Y-axis by means of control of the motor $M_2$, and the number l of moving times in the Y-direction is set as l=0. The number l of moving times in the Y-direction is on integer. This number l of moving times is adjustable with respect to the object 1 to be measured. The total number of moving times is set as $l_F$. In Step $S_2$, the completion of the Y-axis direction operation is judged. If the scanning in the Y direction is completed, then it goes to Step$_{13}$, and, if not, it goes to Step $S_3$. In this embodiment, since l=0 is given, it becomes l≠$l_F$ and it moves to Step $S_3$.

In Step $S_3$, a procedure is performed to obtain eight kinds of first detection data $D_{1l}(m, n)$ and second detection data $D_{2l}(m, n)$ by displacing the M series pattern seven times (m=8) by one pitch width each time on a predetermined Y coordinate in order to obtain a code showing the point position of the object 1 to be measured based on the detection data of the first and second linear image sensors 38 and 40. In this embodiment, reference symbol n denotes a picture element number of the first and second linear image sensors 38 and 40. In this embodiment, the number of the picture elements of the first and second linear image sensors 38 and 40 is 2048. Accordingly, in this embodiment, the total pieces of the first detection data $D_{1l}(m, n)$ and second detection data $D_{2l}(m, n)$ are 8×2048 pieces respectively.

First, in Step $S_3$, the M series pattern scanning is reset, the pattern plate 12 is moved to a predetermined position by means of control of the motor $M_1$ and the number m of the scanning times of the M series pattern is set as m=1. In this Step $S_3$, a projection pattern image is formed on the object 1 to be measured as indicated by symbolic numeral $X_1$ of FIG. 10. In this FIG. 10, the solid straight line shows a slit image, while the broken line corresponds to an image at a place where no slit is formed. This projection pattern image is formed on the picture element surfaces of the first and second linear image sensors 38 and 40 by the objective lenses 34 and 36 of the first and second detecting portions 30 and 32 respectively. And, in Step $S_4$, the first linear image sensor 38 and the second linear image sensor 40 are scanned. Due to the foregoing, the detection outputs of the whole picture elements of the first and second linear image sensors 38 and 40 are taken in the first and second A/D converters in succession and the detection outputs are subjected to the A/D conversion one after another. Thereafter, the detection outputs are stored in a memory 58 as the first detection data $D_{1l}(m, n)$ and second detection data $D_{2l}(m, n)$, respectively, through the control calculating portion.

When all of the detection outputs of the first and second linear image sensors 38 and 40 were stored in the memory 58, it goes to Step $S_5$. In Step $S_5$, it is judged whether the number m of scanning times of the M series pattern is m=8 or not. If the number m of scanning times is m=8, it goes to Step $S_7$ and if the number m of scanning times is not m=8, it goes to Step $S_6$. In Step $S_6$, a move scanning in the pitch width direction of the M series pattern is performed. That is, the motor $M_1$ displaces the M series pattern by one pitch by means of the control calculating portion 50, the content of the number m of scan moving times of the M series pattern is increased by one piece, and it goes to Step $S_4$. Due to the foregoing, the object 1 to be measured is formed with projection pattern images which are indicated by symbolic numerals $X_1$ through $X_8$ in FIG. 10. The projection pattern images $X_1$ through $X_8$ are displaced by one pitch, respectively, with respect to the preceding and following projection pattern images as indicated by arrows. The detection data $D_{1l}(m, n)$ and $D_{2l}(m, n)$ corresponding to the projection pattern images $X_1$ through $X_8$ are stored in the memory 58 every time the move scanning is performed.

Steps $S_7$ through $S_1$ which will be described hereinafter are for extracting the first and second position data corresponding to a predetermined position of the object 1 to be measured from the first and second detection data $D_{1l}(m, n)$ and $D_{2l}(m, n)$. First, in Step $S_7$, a smoothing processing is performed. The terms "smoothing processing" used herein means a processing for taking out data compositions by correcting contract compositions contained in the detection data. That is, the object 1 itself has contrast, and the detection output outputted from the first and second linear image sensors 38 and 40 based on the image of the object 1 on which the pattern is not yet projected becomes something like one shown in FIG. 7(a). When the M series pattern is projected, the first and second linear image sensors 38 and 40 obtain such detection output as shown in FIG. 7(b).

In Step $S_7$, a smoothing signal for cutback as shown by one dotted chain line of FIG. 7(c) is generated in order to remove the detection output based on the contrast composition and extract only the signal composition based on the slit image. The smoothing signal for cutback shown by one dotted chain line here is set slightly higher than the signal level of the contrast shown in FIG. 7(a). This smoothing signal is generated by only low frequency composition obtained by having the detection output shown in FIG. 7(b) transmit through a filter. In this way, the detection data $D_{1i}(m, n)$ and $D_{2i}(m, n)$ corresponding to the slit image are obtained. That is, when $255 \times 8$ pieces of the respective detection data $D_{1i}(m, n)$ and $D_{2i}(m, n)$ obtained by moving the M series pattern seven times are reviewed, they become something like those shown in FIGS. 7(d) through 7(k). The dot "." used herein shows a signal level in a certain picture element. In Step $S_8$, a peak address detection processing is performed in which the address of a peak detection data is obtained from the first and second detection data $D_1(m, n)$ and $D_2(m, n)$. The slit image, which is formed on the first and second linear sensors 38 and 40 after passing through the slit and being reflected on the object 1 to be measured, is imaged on a plurality of picture elements and becomes a detection output as shown in its enlarged view in FIG. 11. Therefore, it is necessary to perform this peak address detection processing.

The peak address N corresponding to the picture elements of the first and second linear image sensors 38 and 40 corresponding to this peak is obtained from the following formula per each peak with respect to the detection data;

$$N_1 = \frac{\sum_{n=n_A}^{n_B} n \times D_{1i}(m, n)}{\sum_{n=n_A}^{n_B} D_{1i}(m, n)} \quad (1)$$

wherein $n_A$ is its first address and $n_B$ is its last address. The peak address $N_2$ can be also obtained in the same procedure with respect to the second detection data $D_{2i}(m, n)$. The peak addresses $N_1$ and $N_2$ can obtain 255 pieces with respect to each detection data point according to the formula (1). The reason is that the peaks overlap each other as shown by a solid line in FIG. 7(l). Such obtained peak addresses $N_1$ and $N_2$ correspond to the center of the elements of the M series pattern.

Then, it goes to Step $S_9$. In Step $S_9$, the data code is decided. That is, data codes of decimal number showing the point positions corresponding to the peak addresses $N_1$ and $N_2$ which were obtained in Step $S_8$ are decided. First, the first and second detection data $D_{1i}(m, n)$ and $D_{2i}(m, n)$ are compared with the respective smoothing signals. If the first and second detection data $D_{1i}(m, n)$ and $D_{2i}(m, n)$ are larger than the smoothing signals, the contents are set as "1", whereas if the first and second detection data $D_{1i}(m, n)$ and $D_{2i}(m, n)$ are smaller than the smoothing signals, the contents are set as "0". Such binary detection data are represented by $D_{1i}'(m, n)$ and $D_{2i}'(m, n)$. On the other hand, if the integer in the vicinity of the peak address N obtained in Step $S_9$ is represented by $N^*$, the data code $AD_{1i}(N^*)$ corresponding to each peak address with respect to the first detection data $D_{1i}(m, n)$ is obtained from the following binary/decimal conversion formula;

$$AD_{1i}(N^*) = 2^7 \times D_{1i}'(1, N^*) + 2^6 \times \quad (2)$$

$$D_{1i}'(2, N^*) + 2^5 \times D_{1i}'(3, N^*) + \ldots + 2^0 \times D'_{1i}(8, N^*)$$

In this way, the respective first and second data codes $AD_{1i}(N^*)$ and $AD_{2i}(N^*)$ are obtained with respect to the first and second data $D_{1i}(m, n)$ and $D_{2i}(m, n)$. These are corresponded to the point positions on the object to be measured and are equivalent to the point position data. Then, it goes to Step $S_{10}$. In Step $S_{10}$, the corresponding points are searched. For this purpose, a table as shown in FIG. 8(a) is prepared beforehand in which the decimal numbers produced by the M series pattern is corresponded to the address numbers. And, regarding the first and second data codes $AD_{1i}(N^*)$ and $AD_{2i}(N^*)$, they are replaced with the corresponding address numbers respectively as shown in FIGS. 8(b) and 8(c), and the corresponding point positions are searched for the remaining address numbers. That is, the peak addresses $N_1$ and $N_2$ of the first and second data codes having the same address numbers are set as $(N_1, N_2)$. The fact that the first and second data codes have the same address numbers means that they correspond to the point position of the object 1 to be measured. In FIG. 8(a), the same address number is shown for the detection numbers 4 and 5. This is shown as a measuring error. In this way, when the same address number appears, the point position cannot be decided. Therefore, such detection data should not be used.

Then, it goes to Step $S_{11}$. In Step $S_{11}$, the coordinate is calculated. The coordinate of the point position of the object 1 to be measured is obtained by calculation from the peak address $N_1$ of the first data code and the peak address $N_2$ of the second data code which have the same address number.

The distances $X_{s1}$ and $X_{s2}$ from one end of the first and second linear image sensors 38 and 40 to the positions of the peak addresses $N_1$ and $N_2$ are shown by $X_{s1} = \alpha \times N_1$ and $X_{s2} = \alpha \times N_2$ wherein $\alpha$ is the distance between the elements. Therefore, under the arrangement shown in FIG. 9, the coordinates X, Y and Z of the point P on the object 1 to be measured are obtained geometrically from the following formulas;

$$X = \frac{L_1 - \alpha X_s}{\alpha(X_s' - X_s) + L_1 - L_2} \times L$$

$$Y = \beta \cdot y_s$$

$$Z = -\frac{f}{\alpha(X_s' - X_s) + L_1 - L_2} \times L$$

wherein $\beta$ is a moving pitch distance by the motor $M_2$, $L_1$ and $L_2$ are distances from the left ends of the first and second linear image sensors 38 and 40 to the centers $O_1$ and $O_2$ of the objective lenses 34 and 36, L is a distance between the centers $O_1$ and $O_2$ of the objective lenses 34 and 36, and f is a focal distance of the objective lenses 34 and 36. The X, Y and Z coordinates are prepared by using the objective lens $O_1$ as the original coordinate point. When the coordinate calculations are finished in Step $S_{11}$, the motor $M_2$ moves the housing 42 by the pitch $\beta$ and increases the number of moving times in the Y direction by one piece by means of control of the control calculating portion 50 in Step $S_{12}$. Then, it goes to Step $S_2$. In Step $S_2$, it goes to Step $S_3$ to continue the measurement until the number l of moving times in the Y direction becomes a predetermined number $l_F$ of times as described in the foregoing. When the number l of moving times in the Y direction reaches the predetermined number $l_F$, it goes to Step $S_{13}$. In Step $S_{13}$, the coordinates of the object 1 to be measured so far obtained are put in order and written in the memory 58. When the writing procedure is finished, it goes to Step $S_{14}$. In Step $S_{14}m$, the measuring results are outputted to a printer, CRT, etc. By this, the measurement is finished thoroughly. It is noted that a highly accurate measurement can be performed by shifting the initial setting of the M series pattern by n pitch.

As described in the foregoing, a shape measuring apparatus according to the present invention comprises a pattern portion having a pattern in which pattern elements are arranged in the pitch width direction according to a predetermined rule so that a plurality of N codes can be distinguished with respect to one another; a projecting portion having a moving portion for moving the pattern in the pitch width direction according to a rule and a projection optical system for projecting the pattern onto an object to be measured; a detecting portion for detecting a first detection data and a second detection data by measuring a surface information of the object to be measured on which the pattern is projected from two different directions every time the pattern is moved by the moving portion; and extracting portion for extracting a first position data and a second position data corresponding to a point position of the object to be measured from the first and second detection data respectively; and a calculating portion for calculating a coordinate of the point position corresponding to the first position data of the object to be measured from the first position data and the second position data. Accordingly, plural kinds of different projection pattern images can be obtained merely by moving only one pattern in the pitch sidth direction without any preparation of plural kinds of patterns. Thus, the shape of an object to be measured can be detected highly accurately and easily.

In this disclosure, there is shown and described only the preferred embodiment of the present invention, but it is to be understood that the present invention is not limited to this. Instead, the present invention is capable of changes and modifications within the scope of the inventive concept as expressed herein.

What is claimed is:

1. A shape measuring apparatus, comprising:
means for forming an M series pattern in which pattern elements are arranged in a pitch width direction so that a plurality of N number of codes can be distinguished with respect to one another;
means for moving said M series pattern in the pitch width direction according to a rule;
projecting optical means for projecting said M series pattern onto the surface of an object to be measured to obtain a plurality of projection pattern images;
detecting means for obtaining a first detection data and a second detection data each time said M series pattern is moved by said moving means, said first and second detection data being determined by projecting said M series pattern onto the object from two different directions to obtain surface information of the object being measured;
extracting means for extracting first positional data and second positional data, including a three dimensional positional designation of each point on the surface of the object to be measured in accordance with said first detection data and said detection data; and
calculating means for calculating a three dimensional position corresponding to said first positional data of each point on the surface of the object to be measured in accordance with said first positional data and a second positional data.

2. The shape measuring apparatus of claim 1, wherein said detecting means includes at least a pair of image sensors spaced apart from one another in the pitch width direction of said M series pattern, and an imaging optical system for forming an image of the object to be measured on said pair of image sensors, the output of one of said pair of image sensors corresponding to said first positional data, and the output of the other of said pair of image sensors corresponding to said second positional data.

3. The shape measuring apparatus of claim 2, wherein each of said pair of image sensors includes a plurality of picture elements forming a display to image said first positional data and said second positional data.

4. The shape measuring apparatus of claim 1, wherein said pattern forming means includes a light transmitting means and a light shading means, said M series pattern being formed by an alternating arrangement of said light transmitting means and said light shading means.

5. The shape measuring apparatus of claim 1, wherein said pattern forming means includes light transmitting means for alternatingly transmitting different colors of light, said M series pattern being formed by an alternating arrangement of the different colors of light.

6. The shape measuring apparatus of claim 1, wherein said pattern includes a slit type blue color filter for permitting a blue color light to transmit therethrough, and a slit type red color filter for permitting a red color light to transmit therethrough, said M series pattern being formed by an alternating arrangement of said blue color filter and said red color filter.

7. The shape measuring apparatus of claims 1, 2, 3, 4, 5, or 6, wherein said M series pattern is displaced from its initial setting by every 1/n pitch in the pitch width direction.

* * * * *